Figure 1:
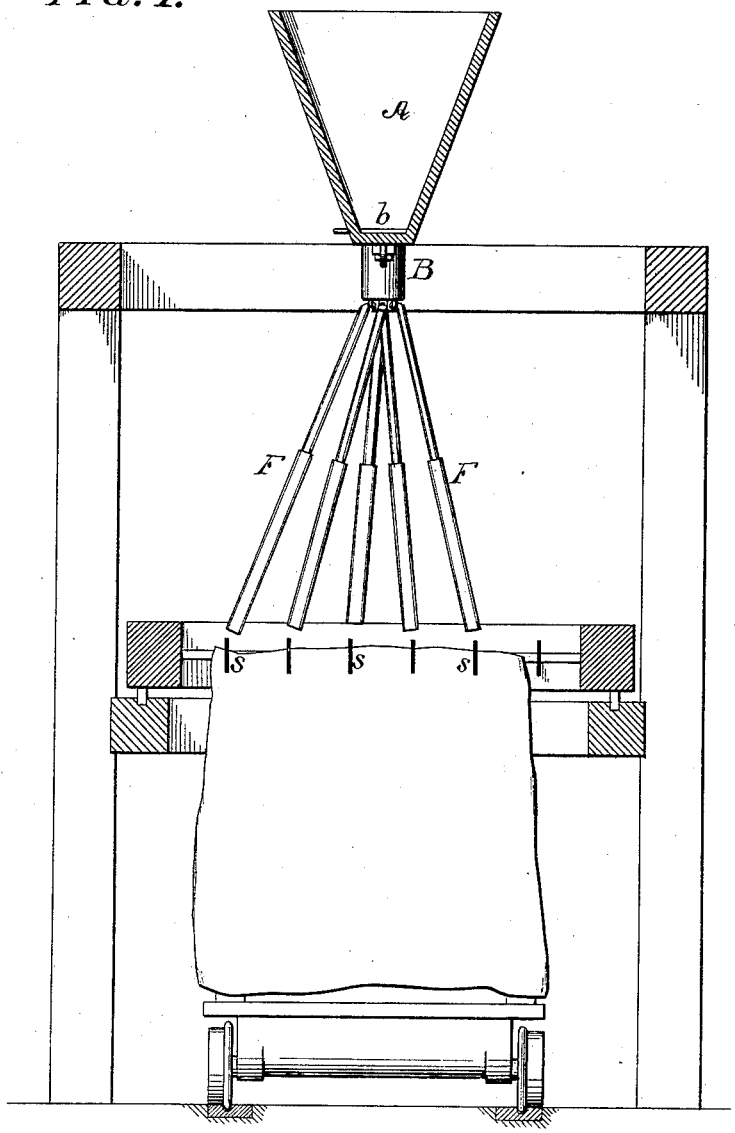

(No Model.) 2 Sheets—Sheet 1.

J. PECKOVER.
SAND FEEDING MECHANISM FOR STONE SAW MILLS.

No. 341,683. Patented May 11, 1886.

Witnesses:
John E. Parker
Wm F. Davis

Inventor:
James Peckover,
by his Attorneys
Howsmorthy (No Model.) 2 Sheets—Sheet 2.
J. PECKOVER.
SAND FEEDING MECHANISM FOR STONE SAW MILLS.
No. 341,683. Patented May 11, 1886.
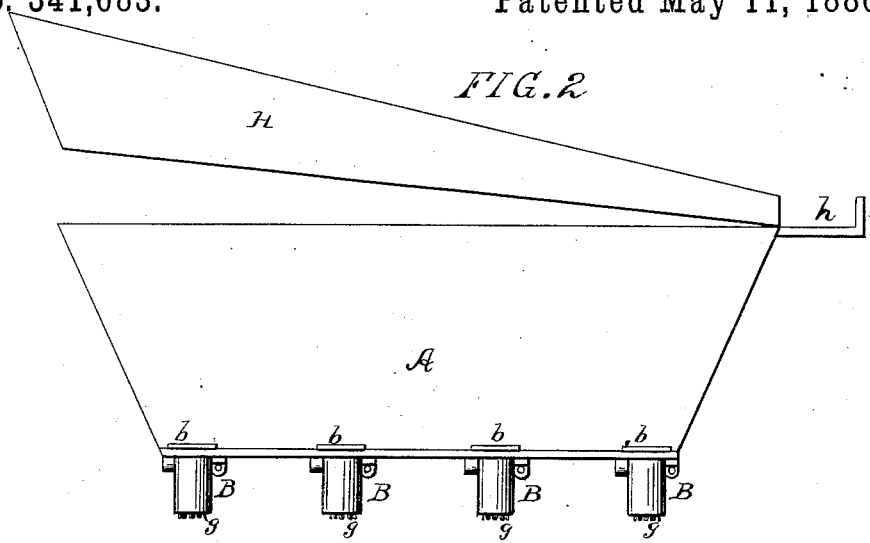
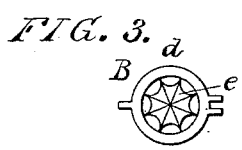
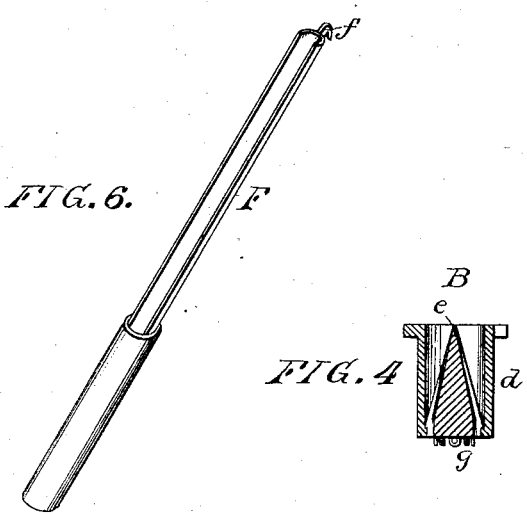
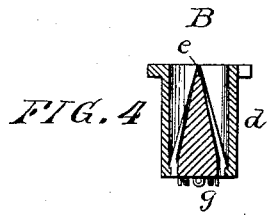
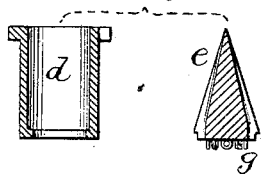
Witnesses:
John E. Parker
William F. Davis
Inventor
James Peckover,
by his Attorneys,
Howson & Son

UNITED STATES PATENT OFFICE.

JAMES PECKOVER, OF PHILADELPHIA, PENNSYLVANIA.

SAND-FEEDING MECHANISM FOR STONE-SAW MILLS.

SPECIFICATION forming part of Letters Patent No. 341,683, dated May 11, 1886.

Application filed February 24, 1886. Serial No. 193,041. (No model.)

*To all whom it may concern:*

Be it known that I, JAMES PECKOVER, a subject of the Queen of Great Britain and Ireland, and residing in Philadelphia, Pennsylvania, have invented certain Improvements in Sand-Feeds for Stone-Saws, of which the following is a specification.

The object of my invention is to construct a device for the efficient and economical distribution of sand or other granular material to the saws of stone-sawing machines, and this object I attain in the manner which I will now proceed to describe.

In the accompanying drawings, Figure 1 is a transverse section of a sawing-machine and my improved feeding devices. Fig. 2 is a side view of the feeding devices. Fig. 3 is a plan view of one of the distributing-spouts. Fig. 4 is a sectional view of the same. Fig. 5 is a sectional view of the two parts of one of these distributing-spouts separated from each other, and Fig. 6 is a perspective view of one of the adjustable conduits.

I provide over the top of the frame A of the machine (Fig. 4) the sand-feeding device which I will now proceed to describe, for the distribution and feeding of the sand or other granular material.

Referring to Figs. 1 and 2, A is a long trough-like hopper, having inclined sides and provided at suitable points along the bottom with distributing-spouts B B, with intermediate slides or gates, $b$, whereby the supply of granular material may be cut off or opened at will. Each of these distributing-spouts is secured to the under side of the hopper in any suitable manner, and each spout consists of a tubular or other suitably-shaped casing, $d$, with an internally-fluted cone, $e$, having its apex near the top of the spout. The number of these flutes on the cone may be varied to suit requirements, and in connection with each flute I provide an adjustable conduit, F, of suitable size, the upper end of the conduit being connected to the spout in any convenient manner. In the present instance I have shown the top of each conduit as provided with a hook, $f$, adapted to be connected with an eye, $g$, on the cone or casing of the spout. These conduits F may be in the form of a tube or a channel, as indicated in Fig. 6. The connection of these conduits with the spouts is such that the lower ends of the conduits can be adjusted within a certain range to the different saw-kerfs, and I prefer to have such a number of these spouts and conduits that there will be a separate conduit to distribute the sand between every pair of teeth on every saw S, if the latter is of the construction shown in my Patent No. 334,678, dated January 19, 1886.

I prefer to make the conduits F in telescopic sections, as shown, so that they may be adjusted to suit various sizes of stones to be sawed.

In connection with the hopper A, I prefer to use a screening device, H, as shown in Figs. 1 and 2, this screening device consisting of a longitudinal trough supported at one end on the hopper or frame, and adjustably supported at the other, so that it can be set to any desired angle. In order to get an even distribution of the sand or other granular material, which is fed into the elevated end of the sieve, the sieve on the bottom of the trough is made tapering, as indicated in Fig. 2, from the upper end down to the lower end thereof. If the sieve part extended across the entire width of the trough at the upper end, as well as the lower end, the material which is fed in at the former would tend to pass through at that point more rapidly or to a greater extent than toward the lower end of the sieve.

At the open lower end of the sieve is a transverse channel, $h$, for the carrying off of larger particles of sand or other material which do not pass through the sieve.

I claim as my invention—

1. The combination of a stone-sawing machine with a sand-feeding hopper provided with a number of spouts and a series of conduits depending from said spouts and independently adjustable to bring their discharging-points immediately over the saw-blades, all substantially as described.

2. The combination of a stone-sawing machine with a sand-feeding hopper having spouts containing fluted cones, with conduits leading from the outlets of the said cones to discharge the sand over the saws, substantially as set forth.

3. The combination of a stone-sawing machine with a sand-feeding hopper over the saws, and conduits leading therefrom to the saws, and a sand-sieve over the top of the hopper, all substantially as specified.

4. The combination of a stone-sawing machine and a sand-feeding hopper therefor, with an inclined sieve over the feed-hopper and having its sieve-surface tapering from its upper to its lower end for the more even feeding of the sand through the hopper, substantially as described.

5. The combination of a stone-sawing machine and sand-feeding hopper having spouts with telescopic conduits leading from the spouts to discharge the sand to the saws, substantially as set forth.

In testimony whereof I have signed my name to this specification in the presence of two subscribing witnesses.

JAMES PECKOVER.

Witnesses:
WILLIAM D. CONNER,
HARRY SMITH.